(12) United States Patent
Lindner-Silwester et al.

(10) Patent No.: US 8,162,325 B2
(45) Date of Patent: Apr. 24, 2012

(54) MULTIPART PACKING RING

(75) Inventors: Tino Lindner-Silwester, Vienna (AT); Christian Hold, Vienna (AT); Alexander Jandl, Rohrendorf (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 809 days.

(21) Appl. No.: 12/289,160

(22) Filed: Oct. 21, 2008

(65) Prior Publication Data
US 2009/0108535 A1    Apr. 30, 2009

(30) Foreign Application Priority Data
Oct. 31, 2007 (AT) .................................. A 1763/2007

(51) Int. Cl.
*F16J 15/00* (2006.01)
(52) U.S. Cl. ...................................................... 277/546
(58) Field of Classification Search .................. 277/416, 277/489–492, 543, 546–548
See application file for complete search history.

(56) References Cited

U.S. PATENT DOCUMENTS

| | | | | |
|---|---|---|---|---|
| 0,865,998 A | * | 9/1907 | Cook | 277/546 |
| 1,338,206 A | * | 4/1920 | Badeker | 277/546 |
| 1,669,074 A | * | 5/1928 | Badeker | 277/547 |
| 1,772,698 A | * | 8/1930 | Badeker | 277/546 |
| 1,967,573 A | * | 7/1934 | Fox | 277/544 |
| 2,055,153 A | * | 9/1936 | Madsen | 277/486 |
| 2,068,723 A | * | 1/1937 | Wheeler | 277/547 |
| 2,191,265 A | * | 2/1940 | Wheeler | 277/546 |
| 2,208,976 A | * | 7/1940 | Halfpenny | 277/546 |
| 2,731,285 A | * | 1/1956 | Cummings | 277/546 |
| 3,305,241 A | * | 2/1967 | Hart | 277/547 |
| 3,711,104 A | * | 1/1973 | Henry | 277/546 |
| 4,350,349 A | | 9/1982 | McTavish | |
| RE31,329 E | * | 8/1983 | Parker | 277/544 |
| 6,439,578 B1 | * | 8/2002 | Radcliffe | 277/489 |
| 6,959,930 B2 | * | 11/2005 | Wood et al. | 277/434 |

FOREIGN PATENT DOCUMENTS

DE    3117603 A1 * 11/1982
EP    1840424      10/2007

OTHER PUBLICATIONS

English Abstract of EP1840424.

* cited by examiner

*Primary Examiner* — Vishal Patel
(74) *Attorney, Agent, or Firm* — Dykema Gossett PLLC

(57) ABSTRACT

A multipart packing ring for sealing a piston rod of a compressor includes ring segments and sealing segments which are alternatingly arranged to form a ring. The ring segments include a curved main part and an axial shoulder and the sealing segments include a curved main part and an axial projection. The circumferential ends of the main part of the ring segments and the circumferential ends of the axial projection of the sealing elements face one another and define first wear gaps there-between.

7 Claims, 6 Drawing Sheets a.)

b.)

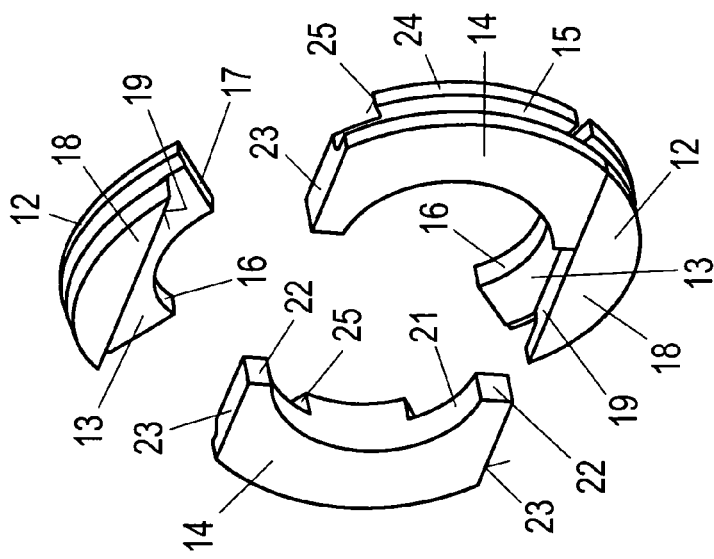
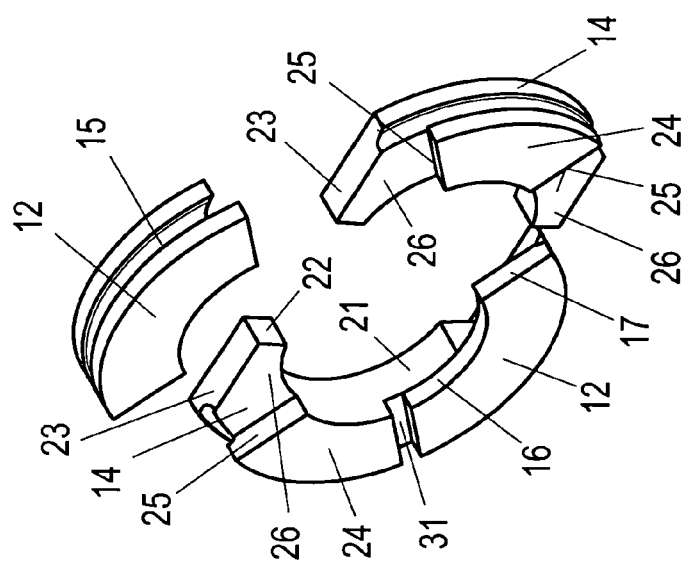
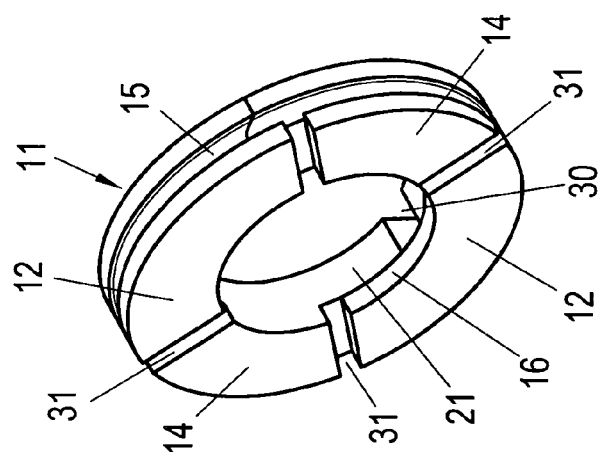
Fig. 3
Fig. 2 a.)　　　　　　　b.)

MULTIPART PACKING RING

BACKGROUND OF THE INVENTION

1. Field of the Invention

The present invention relates to a multipart packing ring with a number of ring segments and a number of sealing segments which are arranged abutting one another in a sealing manner and so as to form a ring and have radially inwardly curved circumferential surfaces, the ring segments being delimited in the circumferential direction at both ends by first radial end surfaces and an axially protruding shoulder, which is radially inwardly delimited by a tangential sealing surface, being provided on the ring segments in the radially outer region, and also to a pressure packing and a seal comprising a multipart packing ring of this type.

2. The Prior Art

Piston compressors, above all of the double-acting design, require sealing of the crank-side compression space in the cylinder, in which the time-variable (high) cylinder pressure $p_{zyl}$ prevails, along the oscillating piston rod 5. This sealing must typically be carried out relative to the (low) atmospheric pressure $p_u$ prevailing in the crankcase. The sealing elements used in a seal 4 of this type are referred to as packing rings 6, 7 and are arranged in what is known as a pressure packing 2 generally consisting of a number of packing rings 6, 7, as illustrated by way of example in a conventional design in FIG. 1. The sealing elements can in this case follow inevitable lateral movements of the piston rod 5 without losing their sealing effect. In order to lengthen the service life and increase the reliability of a pressure packing 2, a plurality of packing rings 6, 7 of this type are connected in series in a pressure packing 2. A plurality of pressure packings are generally lined up one after another in a seal 4. A broad range of configurations of pressure packings 2 and seals 4 of this type are sufficiently well known in the art, for example from GB 928 749 A or U.S. Pat. No. 1,008,655 A.

Packing rings 6, 7 are self-activating seals which for a sufficient sealing effect, i.e. sufficiently little leakage, generally require a certain pressure differential $p_1-p_2$ to be sealed (FIG. 1c). The gas pressure in a packing chamber 3 decreases in the gaps to be sealed of a packing ring 6, 7 from the higher level $p_1$ to the lower level $p_2$ in the next packing chamber 3. FIG. 1c shows schematically this reduction in pressure in the sealing gap formed between the packing ring 6, 7 and piston rod 5. This sealing gap has a critical role with regard to the effectiveness of the packing rings 6, 7, as the relative movement of the contact surfaces between the piston rod 5 and rings 6, 7 brings about wear to the packing rings 6, 7. This ring wear generally requires cut ring shapes allowing automatic continuous adjustment of the ring in the event of removal of material from this sealing gap between the ring and piston rod. Radially and tangentially cut rings 6, 7, which are used in pairs in packing chambers of the pressure packing in order mutually to cover the impact gaps which occur in order to compensate for wear, as is schematically illustrated in FIG. 1b, are in this case standard in industry. Radially/tangentially cut ring combinations of this type are single-acting seals which seal only in the direction of the crosshead, whereas in the course of the crank-side reexpansion phase of the piston compressor 1 the radial cuts ensure that no elevated pressure can be enclosed in the packing. As is known, in cut ring shapes, use is conventionally made of hose springs (circumferential springs) 9 which are wound over the outer circumference and press the packing rings 6, 7 against the piston rod 5 even in the pressureless state.

Specifically at elevated pressures, in conventional arrangements, significant extrusion of the packing rings 6, 7 can also occur in the gap formed between the piston rod 5 and packing housing or chamber disc 10. In order to avoid this extrusion as far as possible, additional metallic support rings 8, which do not touch the piston rod 5 in a planar manner, can be used between the ring on the low-pressure side and the chamber disc 10, as disclosed for example in U.S. Pat. No. 3,305,241.

In a combination of a radially and a tangentially cut packing ring, the sealing toward the piston rod is carried out substantially only by the tangentially cut packing ring, the ring segments of which can slide together as a result of the tangential cut guidance in the event of wear and thus maintain the sealing effect. The radially cut packing ring serves substantially just to seal the wear gaps of the tangential packing ring in the axial and radial direction. The radial packing ring wears only until the ring segments abut one another in the circumferential direction. The radially and tangentially cut packing rings thus wear to differing degrees. In order to prevent the radially and the tangentially cut packing ring from rotating relative to each other, which can lead to the wear gaps of the tangentially cut packing ring no longer being covered so that the sealing effect would be lost, a rotation prevention means has to be provided between the rings. A rotation prevention means of this type is generally configured as a pin which is placed in associated recesses in the radially and tangentially cut packing ring. However, as a result of the differing wear to the radially and tangentially cut packing rings, a pin of this type is subjected with continuous wear to ever greater shear stress; this frequently leads to the pin breaking and thus the rotation prevention means and subsequently possibly also the sealing effect of the seal becoming lost.

In the prior art, it has therefore already been proposed to provide not a packing ring combination of a radially and tangentially cut packing ring, but rather merely a single packing ring. In order on the one hand not to lose the required sealing effect relative to the piston rod even under the wear which inevitably occurs and also to be able to ensure an adequate seal also in the axial and radial direction, specially cut packing rings are required for this purpose. Packing rings of this type are known from U.S. Pat. Nos. 2,208,976 and 4,350,349 which describe a six-part packing ring with radially cut ring segments which are held together by a circumferential spring. Radial wear gaps are produced in the circumferential direction between the ring segments. An axially protruding shoulder, which is radially inwardly delimited by a tangential sealing face, is provided on each ring segment to seal said wear gaps. An axial recess is thus formed between these shoulders. In order to seal the wear gaps in the axial and radial direction, sealing segments, which abut the tangential sealing surfaces with tangential end surfaces and cover the wear plate, are inserted into this recess. These sealing segments are held together by a further circumferential spring. Both ring segments and sealing segments rest in this case against the piston rod substantially (apart from necessary wear gaps) over the entire circumference for sealing toward the piston rod. However, the problem with a packing ring of this type is that the ring segments and the sealing segments are subjected to differing wear. The high pressure-side high gas pressure is applied to the ring segments on their outer diameter, whereas less gas pressure, which is reduced by the sealing segments, acts on their inner diameter. As in radially/tangentially cut ring pairs, the ring segments thus wear more rapidly than the sealing segments, as a result of which the entire available ring material is not optimally used in terms of wear. Moreover, these non-uniform rates of wear cause the surface pressure between the tangential sealing surfaces to decrease more and more until sooner or later there is no longer an adequate sealing effect and the leakage through the packing ring becomes unacceptably great.

It is therefore an object of the invention to eliminate the above-described drawbacks of a packing ring of this type, in particular to reduce the wear to a packing ring of this type and the leakage through a packing ring of this type and accordingly to lengthen the service life of a packing ring of this type.

SUMMARY OF THE INVENTION

According to the invention, this object is achieved in that an axial projection, which widens the radially inner curved circumferential surface of the sealing segment in the axial direction in the region of the projection, is provided on the sealing segments and the projection is arranged, viewed in the circumferential direction, between the ends of the ring segments and so as to form first wear gaps set apart from the ends of the ring segments. As a result, more material is available for wear on the sealing segments in the axial direction. Thus, the wear to the sealing segments can be effectively reduced while the surface pressure remains constant (as a result of the pressure applied to the outer circumferential surface). In an embodiment of this type, the ring segments abut the component to be sealed then only over a small region and serve therefore substantially only to seal the wear gaps between the sealing segments.

Advantageously, a tangential end surface and a second radial end surface are provided on each of the sealing segments at their ends viewed in the circumferential direction, the tangential end surfaces abutting the tangential sealing surfaces of adjacent ring segments and the second radial end surfaces being arranged facing one another and set apart from one another so as to form a second wear gap. An arrangement of this type allows the sealing segments, apart from the wear gaps which are formed, to abut the component to be sealed over the entire circumference and thus substantially the sealing segments to perform the sealing relative to the component to be sealed.

Most particularly advantageously, the multipart packing ring is configured in four parts with two ring segments and two sealing segments, the ring and sealing segments each being arranged opposing one another and the radially inner circumferential surface of the sealing segments forming a circumferential surface which is closed apart from the first wear gaps. This symmetrical, two-part cut guidance causes a wear image in which the two sealing segments migrate radially inward, so that the greatest wear occurs at the centre of the segment, i.e. in the region of greatest material thickness, whereas the rigidity of the sealing segments causes less wear on the two sealing segment ends viewed in the circumferential direction. This allows the wear to be reduced still further. In addition, as a result, the seal between the tangential sealing surfaces does not deteriorate with increasing wear, as the respectively abutting tangential sealing surfaces come to lie in one plane over the entire service life, as a result of which the tangential sealing surfaces rest at all times uniformly on one another. On the other hand, the sealing segments do not wear so markedly at their segment ends viewed in the circumferential direction owing to their (substantially) constant rigidity; this prevents, together with the lesser wear to the sealing segments, also opening of the tangential sealing surfaces.

In order to reduce the contact force which is relevant for wear and with which the sealing segments are pressed against the component to be sealed and thus to reduce wear, a circumferential groove, which is connected to a second radial sealing surface of the sealing segment via a recess in the region of the second wear gap, is advantageously provided on the radially inner circumferential surface of a sealing segment for pressure compensation.

In order to reduce the tendency toward tilting of the sealing segments, a high-pressure groove, which is connected to the outer circumferential surface of the packing ring via a recess or to a second radial sealing surface of the sealing segment via a recess in the region of the second wear gap, is advantageously provided on the radially inner circumferential surface of a sealing segment and a low-pressure groove, which is connected via a recess to the end face of the packing ring that is remote from the axial projection, is provided between the high-pressure groove and axial projection.

If a radial step is provided in the ring segments and sealing segments at the end face with the axial projection, a further design feature is available in order to cause, by purposefully bringing about a certain radial flexural rigidity of the ring and sealing segments, these segments to rest with sufficient surface pressure both on the component to be sealed and on the tangential sealing surfaces. As a result of a radial step of this type, on the one hand, the ends of the ring segments that are positioned in the circumferential direction are no longer fully connected to the ring segment, as a result of which the ring segment can abut more effectively the component to be sealed and as a result seal more effectively the cuts of the sealing segments. On the other hand, this also makes the ends of the sealing segments more flexible, and this makes the packing ring less sensitive to any shape deviations with regard to the sealing situation. This does not restrict the supporting of the sealing segments at the centre of the segment.

The present invention will be described hereinafter with reference to the schematic, exemplary and non-restrictive FIGS. 1 to 2 which show advantageous configurations.

BRIEF DESCRIPTION OF THE DRAWINGS

FIG. 2 is a perspective view of a packing ring according to the invention;

FIGS. 3a and 3b are exploded views of FIG. 2 as seen from respective opposite sides;

DETAILED DESCRIPTION OF THE PREFERRED EMBODIMENTS

Figure 1B:
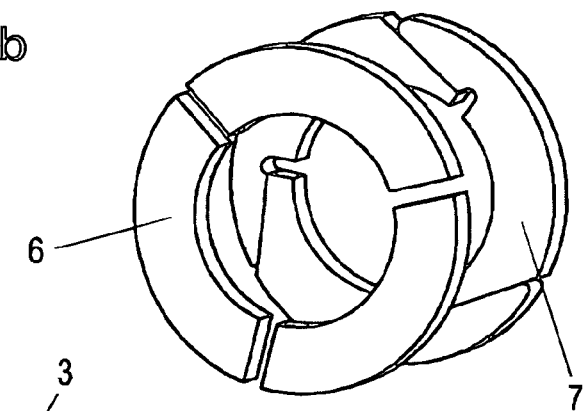
FIG. 1 shows a known conventional seal with a radially and a tangentially cut packing ring.

FIG. 2 shows a preferred embodiment of the multipart packing ring 11 in the form of a four-part ring. To improve understanding, FIGS. 3a and 3b show differing exploded views of the same packing ring. The following description will refer to FIGS. 2 and 3.

The packing ring 11 consists in this case of four parts: two ring segments 12 and two sealing segments 14 which form a ring and abut one another in a sealing manner. A circumferential groove 15, in which a circumferential spring can be arranged for holding the segments together, can be formed in the outer circumferential surface of the ring and sealing segments 12, 14. The two ring segments 12 and sealing segments 14 respectively are each arranged opposing one another.

The ring segments 12 have radially inwardly a curved, generally a circular, circumferential surface 16 which, when the packing ring 11 is in use, abuts in a sealing manner the component to be sealed, in this case the piston rod of the compressor. An axially protruding shoulder 18, which is radially inwardly delimited by a tangential sealing surface 19, is also provided on the ring segments 12 in the radially outer region of the ring segment 12. Between the tangential sealing surface 19 and circumferential surface 16, a first radial sealing surface 13 is thus also formed at the end face. Viewed in the circumferential direction, the ring segment 12 is delimited at both ends by a first radial end surface 17.

The sealing segments 14 have radially inwardly also a curved, generally a circular, circumferential surface 21 which, when the packing ring 11 is in use, abuts in a sealing manner the component to be sealed, in this case the piston rod of the compressor. The sealing segments 14 are delimited, viewed in the circumferential direction, at their two ends by a second radial end surface 22 and a tangential end surface 23. An axial projection 24, which radially inwardly extends the sealing surface 21 in the axial direction, is also provided on the sealing segment 14. This axial projection 24 is in this case arranged at the end face opposing the axial shoulder 18 of the ring segments 12. Viewed in the circumferential direction, the projection 24 extends only over a portion of the sealing segment 14 and is closed off at both ends by a third radial end surface 25. A step is thus formed in the circumferential direction. Between the third radial end surface 25 and the ends of the sealing segment 14, a second radial sealing surface 26 is thus formed at the end face.

In the assembled state, the tangential end surfaces 23 of the adjacent sealing segments 14 abut the tangential sealing surface 19 of a ring segment 12 in a sealing manner. The second radial sealing surfaces 26 of the adjacent sealing segments 14 also abut the first radial sealing surface 13 of the ring segment 12 in a sealing manner. In this case, the second radial end surfaces 22 of the sealing segments 14 are arranged opposing one another and form a wear gap 30. The inner circumferential surfaces 21 of the two sealing segments 14 are thus almost, apart from the wear gaps 30, closed. The axial projection 24 of the sealing elements 14 is arranged between the ends of the ring segments 12. The first radial end surfaces 17 and the third radial end surfaces 25 of adjacent ring and sealing segments 12, 14 are in this case arranged facing one another and set apart from one another so as to form a first radial wear gap 31. The two wear gaps 30, 31 are thus arranged at different end faces of the packing ring 11. As a result of this arrangement of the ring segments 12 and sealing segments 14, the multipart packing ring 11 seals in both the radial and the axial direction and on the inner circumferential surface also relative to the component to be sealed, for example a piston rod.

However, the packing ring 11 is not restricted to a four-part ring, but rather can also consist of more than four parts, for example six or eight parts, the configuration of the individual ring segments 12 and sealing segments 14 and the interaction of the individual segments being as above.

Figure 4:
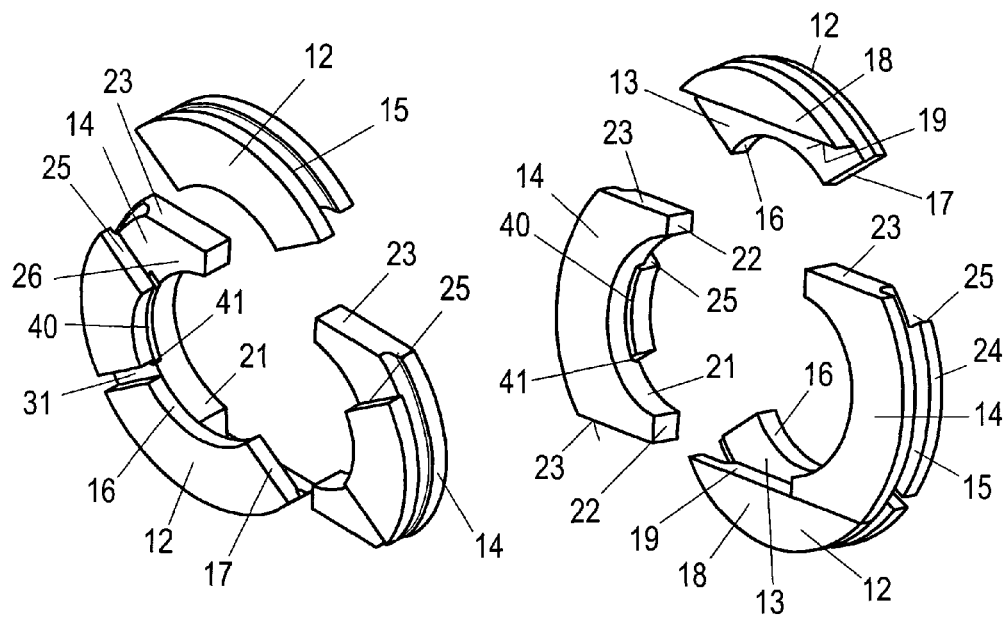
FIG. 4 shows differing exploding views of a packing ring with pressure compensation.
Figure 5:
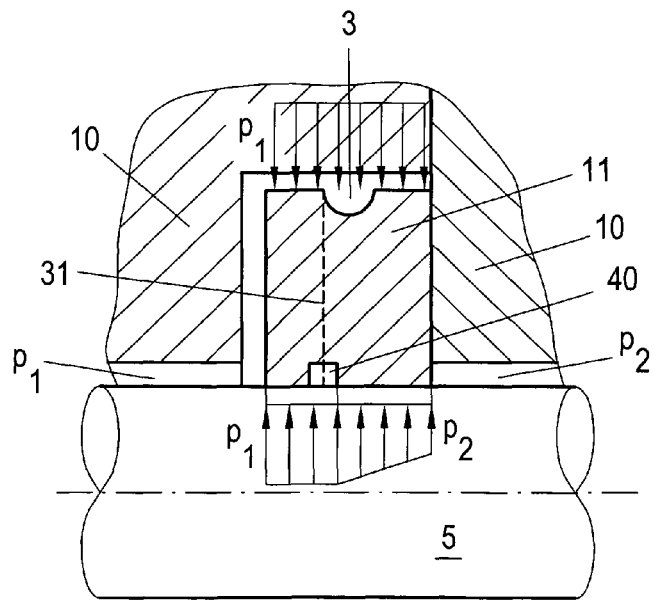
FIG. 5 shows the resulting pressure distribution.

Pressure compensation can also be carried out very easily on a packing ring 11 according to the invention, as is shown in FIG. 4 based on the example of a four-part packing ring 11. A circumferential groove 40, which in the example shown extends in the circumferential direction between the two third radial end surfaces 25 of the sealing segment 14 and is connected in the region of the second wear gap 31 to the second radial sealing surface 26 of the sealing segment 14 via a recess 41, is in this case formed in the inner circumferential surface 21 of the sealing segments 14. Thus, the pressure acting in the wear gap 31 acts also in the circumferential groove 40. The resulting pressure distribution will be described hereinafter with reference to FIG. 5.

Figure 1C:
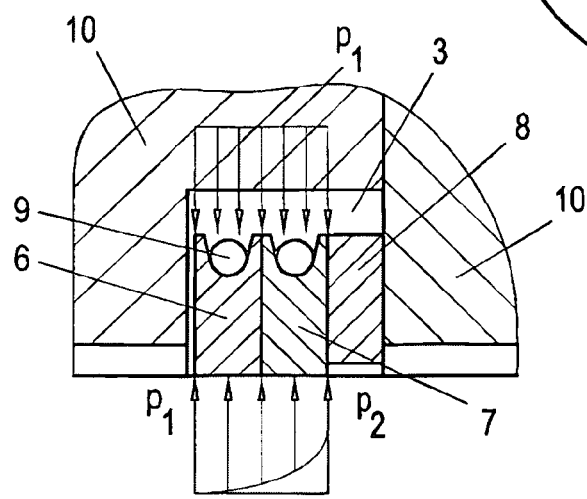
Figure 1A:
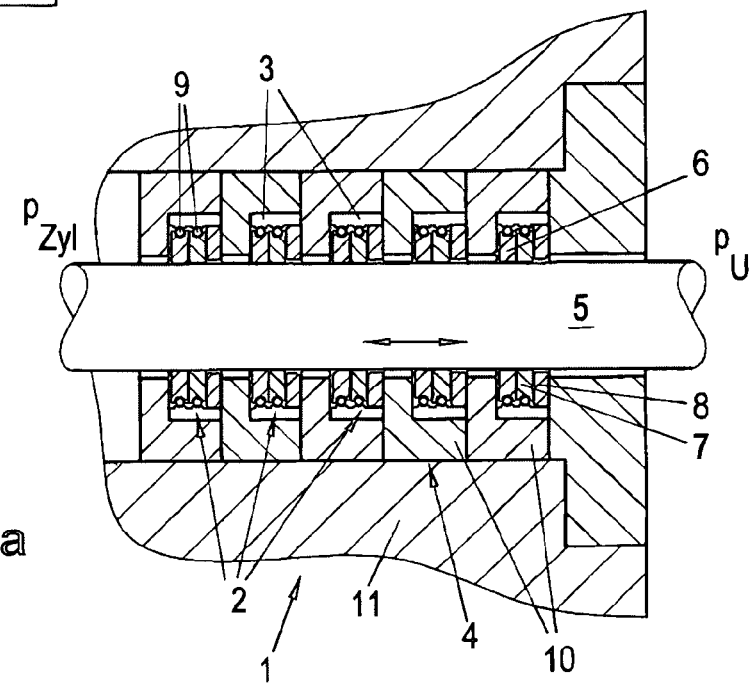

The multipart packing ring 11 is arranged in a packing chamber 3, for example again formed between two chamber discs 10 positioned axially next to each other (as in FIG. 1). In this case, the axial projection 24 of the sealing segments 14 faces the side with the high pressure Pi. The packing ring 11 is again pressed by the high pressure Pi in a sealing manner against the low pressure-side wall of the packing chamber 3. On the radially outer circumferential surface, the high pressure $p_1$ acts on the packing ring 1 and presses said packing ring against the piston rod 5 in a sealing manner. Through the connection of the circumferential groove 41 to the first wear gap 31 and thus to the space with high pressure $p_1$, the high pressure $p_1$ also acts in the circumferential groove 41. Between the circumferential groove 41 and the low-pressure side, the pressure is reduced to the low pressure $p_2$. This allows the surface pressure acting between the packing ring 11 and piston rod 5, and accordingly the wear, to be reduced.

Figure 6:
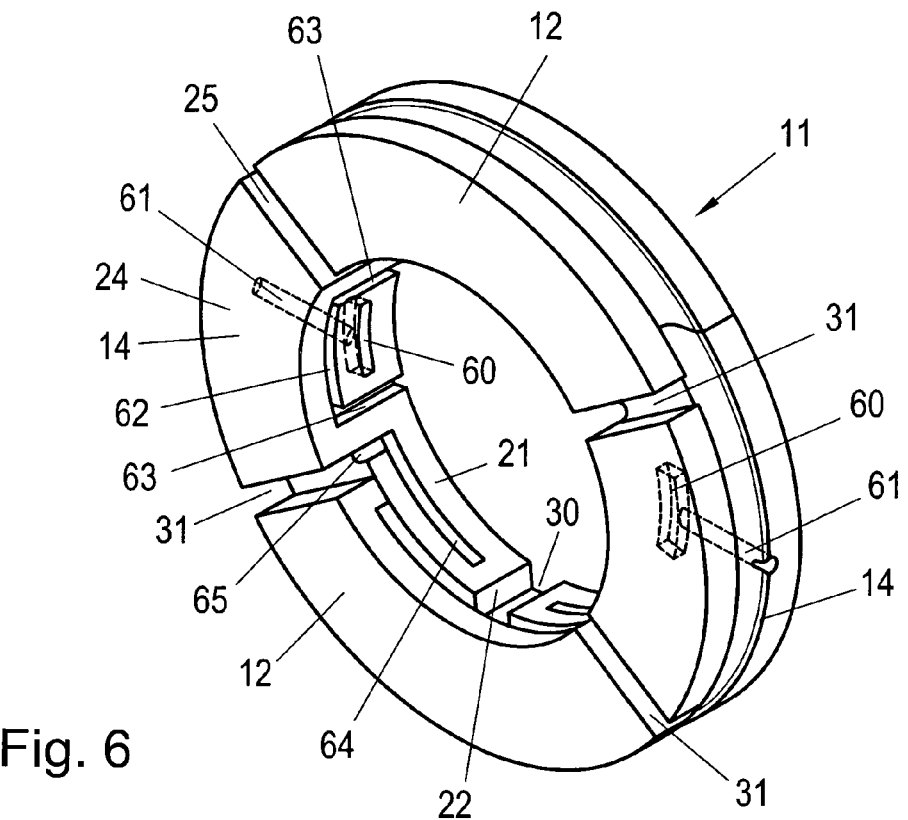
FIG. 6 shows a packing ring with alternative pressure compensation.
Figure 7:
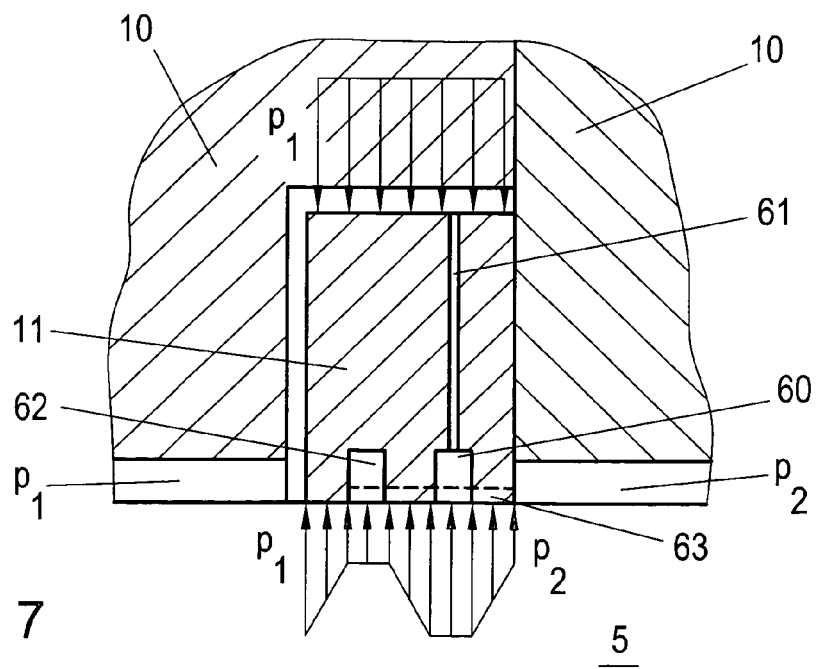
FIG. 7 shows the resulting pressure distribution.

A further possibility for pressure compensation can be described with reference to FIGS. 6 and 7. In this embodiment, a circumferential groove 64 is provided in the circumferential surface 21 between the third radial end surface 25 and second radial end surface 22. This circumferential groove 64 is connected in the region of the second wear gap 31 to the second radial sealing surface 26 of the sealing segment 14 via a recess 65, so that the pressure acting in the wear gap 31 acts in the circumferential groove 64. A circumferential groove 64 of this type can in this case be provided at both ends, viewed in the circumferential direction, of the sealing segment 14. The effect of this circumferential groove/these circumferential grooves 64 is in this case the same as described hereinbefore with reference to FIGS. 4 and 5. However, owing to the pressure distribution which is set on the inner circumferential surface 21, a packing ring 11 with pressure compensation of this type has an intensified tendency toward tilting and non-uniform wear associated therewith. In order to reduce the tendency to tilt, a high-pressure groove 60, which is connected to the outer circumferential surface of the packing ring 11 via a radial recess 61, preferably a simple bore, is provided in the inner circumferential surface 21 of the sealing segment 14 in the region of the axial projection 24, so that the pressure acting on the outer circumferential surface is also applied in the high-pressure groove 60. Alternatively, instead of a radial recess 61, the high-pressure groove 60 could also be connected in the region of the second wear gap 31 to the second radial sealing surface 26 of the sealing segment 14 via a further axial recess. A low-pressure groove 62, which is connected to the end face of the packing ring 11 that is remote from the axial projection 24 via an axial recess 63, in this case two axial grooves arranged next to the high-pressure groove 60 in the circumferential direction, is also provided between the high-pressure groove 60 and axial projection 24, in fact the end face of the axial projection 24, so that the pressure acting on this end face is applied in the low-pressure groove 62. The effect of this high and low-pressure groove 60, 62 may be seen from FIG. 7. The high pressure $p_1$ acts again on the outer circumferential surface of the packing ring 11 and accordingly via the recess 61 also in the high-pressure groove 60. The low-pressure groove 62, which is arranged between the high-pressure groove 60 and the side with the high pressure $p_1$, is connected to the side of the low pressure $p_2$ via the recess 63, so that the low pressure $p_2$ also prevails in the low-pressure groove 62. The pressure acting on the inner circumferential surface 21 thus drops in the region of the low-pressure groove 62 in order thereafter to rise back to the high pressure $p_1$. This pressure distribution thus counteracts tilting of the sealing segment 14 through the circumferential groove(s) 64 serving to compensate for pressure.

However, the arrangement of a high- and low-pressure groove 60, 62 in the inner circumferential surface 21 of the sealing segment 14 is independent of the arrangement of a circumferential groove 40, 64 for compensating for pressure. The high- and low-pressure groove 60, 62 could therefore also be provided without a circumferential groove 40, 64.

Figure 8:
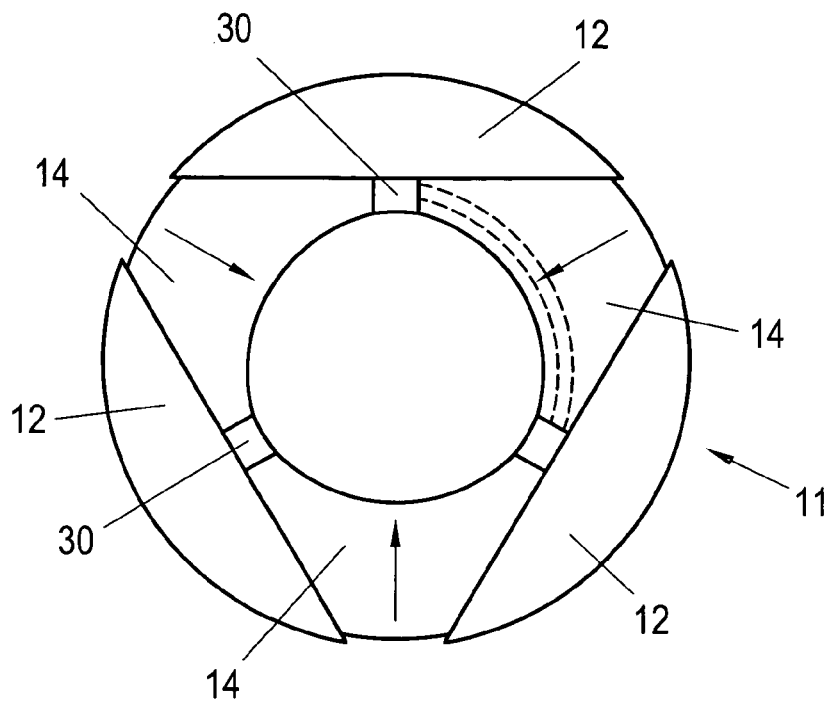
FIGS. 8 and 9 are schematic views of the continuous wear to a packing ring according to the invention.
Figure 9:
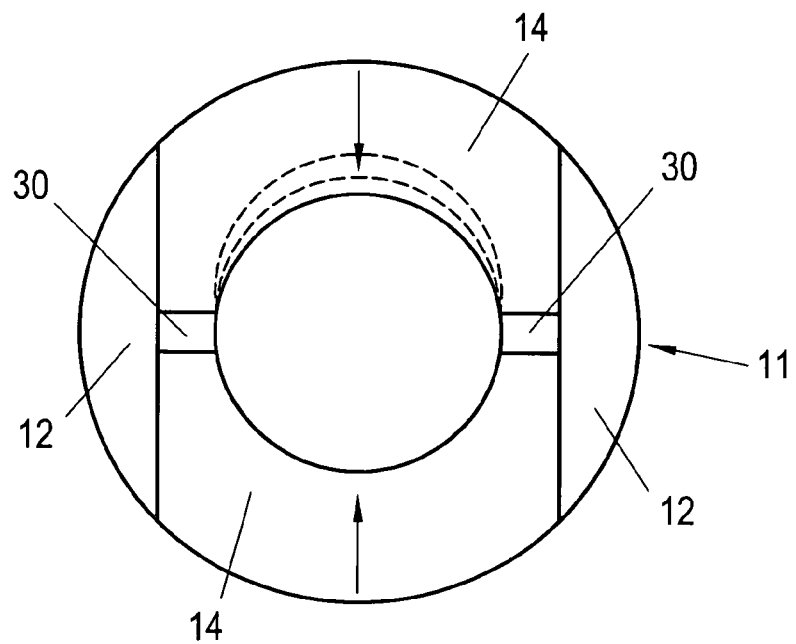

With continuous wear, the sealing segments 14 slide together, as is shown in FIG. 8 with reference to a six-part packing ring 11 and indicated by the arrows, the broken lines illustrating the increasing wear. In a packing ring 11 of this type, as a result of the wear, the ends of the sealing segments 14 become increasingly weak and thus lose rigidity. In a four-part packing ring, as described above, the sealing segments 14 also slide radially together under wear, as shown in FIG. 9 although in this case the ends of the sealing segments 14 retain their strength and the rigidity of the ends thus does not substantially change. As a result, the wear is greatest at the centre of the segment, i.e. in the region of the axial projection 24. However, as the full material thickness is available at this location, this allows the wear to be reduced.

Figure 10:
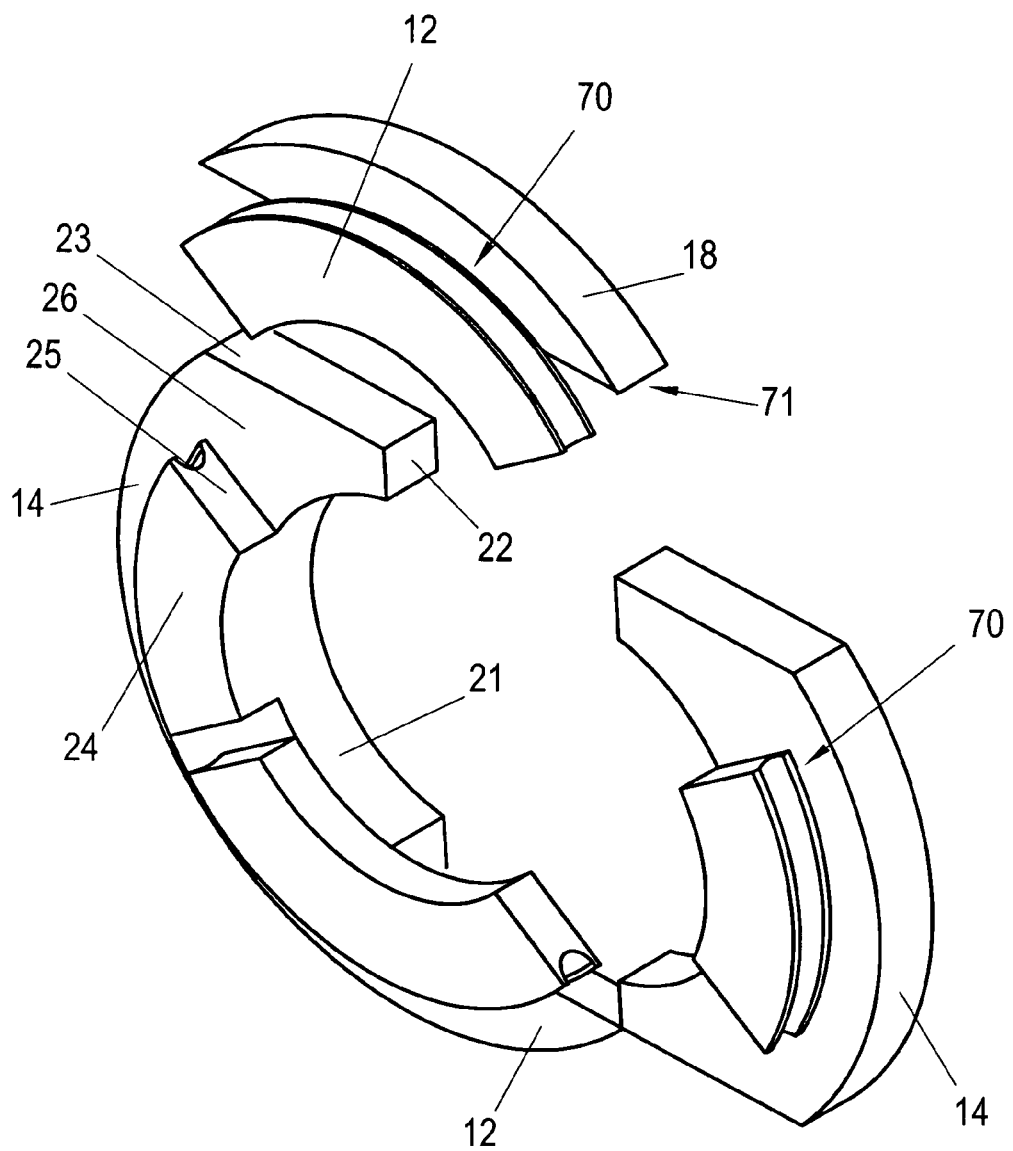
FIG. 10 shows a further configuration of a packing ring according to the invention.

In a further advantageous configuration of a packing ring 11, a radial step 70 is provided at the end face of the axial projection 24 in the radially outer region of the packing ring 11, as illustrated in FIG. 10. As a result, on the one hand, the axial shoulder 18 is no longer continuously connected to the ring segment 12; instead, the ends 71 of the shoulders 18 are free. On the other hand, the sealing segment 14 is as a result configured in the region of the axial projection 24 to be flexible as a result of the radial step. The formation of a radial step of this type provides a further design feature in order to improve the sealing effect by purposefully bringing about a certain radial flexural rigidity of the segments 12, 14.

The invention claimed is:

1. A multipart packing ring comprising a plurality of ring segments and a plurality of sealing segment which are positioned around an imaginary center of said packing ring, each of said plurality of ring segments including a curved main part defining circumferentially opposite radial end surfaces, and an axially-extending shoulder part which extends from a radially outer region of said curved main part, said shoulder part defining a radially inwardly facing, tangentially-extending sealing surface, and each of said sealing segments including a curved main part defining circumferentially opposite first radial end surfaces and tangential end surfaces, and a curved axially-projecting part defining circumferentially opposite second radial end surfaces, said curved main part of each said sealing segment and associated curved axially-projecting part together defining a radially inwardly facing inner circumferential surface, said ring segments and said sealing segments alternatingly abutting one another and engaged such that said circumferentially opposite radial end surfaces of said curved main portion of said ring segments face said circumferentially opposite second radial end surfaces of said axially-projecting parts of said sealing segments and provide respective first wear gaps therebetween, the tangential end surfaces of said curved main part of the sealing segments abutting the tangentially-extending sealing surfaces of the shoulder parts of adjacent ring segments and respective circumferentially opposite radial first end surfaces of said main parts of adjacent sealing segments facing one another and set apart to from second wear gaps.

2. The multipart packing ring according to claim 1, consisting of two ring segments and two sealing segments, the ring segments being opposite on another and the sealing segments being opposite one another and the radially inner circumferential surface of the sealing segments forming a circumferential surface which is closed apart from the second wear gaps.

3. The multipart packing ring according to claim 1, wherein each sealing segment includes a circumferential groove which is connected to a second radial sealing surface via a recess in the region of the first wear gap on the radially inner circumferential surface of each sealing segment.

4. The multipart packing ring according to claim 1, including a high-pressure groove which is connected to the outer circumferential surface of the packing ring via a recess or to a second radial sealing surface of the sealing segment, via a recess in the region of the second wear gap on the radially inner circumferential surface of a sealing segment, and a low-pressure groove which is connected via a recess to the end face of the packing ring that is remote from the axial projection between the high-pressure groove and axial projection.

5. The multipart packing ring according to claim 1, wherein said ring segments and sealing segments define a radial step at the end face with the axial projection in the radially outer region.

6. A pressure packing consisting of a multipart packing ring according to claim 1, which is arranged in a packing chamber, wherein the axial projection of the sealing segments faces a side with high pressure ($p_1$).

7. A seal between a piston rod of a compressor and a compressor housing with a number of pressure packings which are arranged axially next to one another and each consist of a multipart packing ring according to claim 1, which is arranged in a packing chamber, wherein the axial projection of the sealing segments faces the side with the high pressure ($p_1$).

* * * * *